(12) United States Patent
Aoki et al.

(10) Patent No.: US 8,725,403 B2
(45) Date of Patent: May 13, 2014

(54) VEHICLE CONTROL APPARATUS, VEHICLE, AND VEHICLE CONTROL METHOD

(75) Inventors: Hirofumi Aoki, Susono (JP); Hiroshi Yasuda, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 192 days.

(21) Appl. No.: 13/375,023

(22) PCT Filed: May 26, 2010

(86) PCT No.: PCT/IB2010/001246
§ 371 (c)(1),
(2), (4) Date: Jan. 19, 2012

(87) PCT Pub. No.: WO2010/136882
PCT Pub. Date: Dec. 2, 2010

(65) Prior Publication Data
US 2012/0116665 A1 May 10, 2012

(30) Foreign Application Priority Data

May 29, 2009 (JP) ................................ 2009-130746
Jul. 3, 2009 (JP) ................................ 2009-159082

(51) Int. Cl.
*B60W 40/08* (2012.01)
*G01S 13/93* (2006.01)
*G08G 1/16* (2006.01)
*B60T 8/1755* (2006.01)

(52) U.S. Cl.
USPC ........................................ 701/301; 701/300

(58) Field of Classification Search
None
See application file for complete search history.

(56) References Cited

U.S. PATENT DOCUMENTS

| | | | |
|---|---|---|---|
| 3,984,836 A * | 10/1976 | Oishi et al. ..................... | 342/135 |
| 6,014,601 A * | 1/2000 | Gustafson ....................... | 701/45 |
| 6,894,608 B1 | 5/2005 | Gunderson | |
| 2002/0101337 A1 | 8/2002 | Igaki et al. | |
| 2004/0172185 A1 | 9/2004 | Yamamura et al. | |
| 2005/0087381 A1 | 4/2005 | Tobata | |
| 2005/0110348 A1* | 5/2005 | Hijikata et al. ............... | 307/10.1 |

(Continued)

FOREIGN PATENT DOCUMENTS

| | | |
|---|---|---|
| EP | 1 426 230 | 6/2004 |
| EP | 1 527 959 | 5/2005 |

(Continued)

OTHER PUBLICATIONS

International Search Report Issued Sep. 28, 2010 in PCT/IB10/001246 Filed May 26, 2010.

*Primary Examiner* — Michael J Zanelli
(74) *Attorney, Agent, or Firm* — Oblon, Spivak, McClelland, Maier & Neustadt, L.L.P.

(57) ABSTRACT

A perceived relative distance that shows a relative distance between a host vehicle and a perception object perceived by a driver of the host vehicle is calculated on the basis of an actual relative distance therebetween. A perceived relative velocity that shows a relative velocity between the host vehicle and the perception object perceived by the driver is calculated on the basis of an actual relative velocity therebetween. A perceived relative ratio that is a ratio between the perceived relative distance and the perceived relative velocity is calculated. If the perceived relative ratio exceeds a threshold value, a vehicle control is performed.

13 Claims, 6 Drawing Sheets

(56) References Cited

U.S. PATENT DOCUMENTS

| | | |
|---|---|---|
| 2005/0168331 A1 | 8/2005 | Gunderson |
| 2006/0022808 A1 | 2/2006 | Ito et al. |
| 2007/0021876 A1 | 1/2007 | Isaji et al. |
| 2007/0078602 A1 | 4/2007 | Yamamura et al. |
| 2009/0278672 A1 | 11/2009 | Weilkes et al. |

FOREIGN PATENT DOCUMENTS

| | | | |
|---|---|---|---|
| EP | 1 721 800 | | 11/2006 |
| JP | 2002-220035 A | | 8/2002 |
| JP | 2003 208602 | | 7/2003 |
| JP | 2007-196903 | * | 8/2007 |
| WO | 2006 108751 | | 10/2006 |

* cited by examiner

VEHICLE CONTROL APPARATUS, VEHICLE, AND VEHICLE CONTROL METHOD

BACKGROUND OF THE INVENTION

1. Field of the Invention

The invention relates to a vehicle control apparatus, a vehicle, and a vehicle control method.

2. Description of the Related Art

Normally, drivers of vehicles operate the vehicles on the basis of at least their own perception. A driver perceives a relative relation between the vehicle that the driver drives, that is, the host vehicle, and a perception object that is perceivable by the driver, such as a preceding vehicle that precedes the host vehicle, or the like, on the basis of stimuli to the driver's sensory organs such as the eyes, the ears, etc. According to the perception, the driver performs the acceleration or deceleration of the vehicle through operation of the accelerator pedal, the deceleration of the vehicle through operation of the brake pedal or the shift lever, the turning or cornering of the vehicle through operation of the steering wheel, etc. That is, the driver operates the vehicle by driving the vehicle on the basis of the driver's own perception.

Besides, for example, Japanese Patent Application Publication No. 2003-208602 (JP-A-2003-208602) discloses a vehicle control apparatus that performs a vehicle control in which the vehicle is controlled by using as an input value the relative relation between the perception object and the host vehicle. The vehicle control apparatus as shown in JP-A-2003-208602, for example, uses as input values the actual relative distance and the actual relative velocity between the host vehicle and a preceding vehicle, and performs a deceleration control of decelerating the vehicle on the basis of a relative ratio that is a ratio between the relative distance and the relative velocity, or the like.

By the way, the foregoing relative relation according to the perception of the drive can have an error from the actual relative relation. For example, as for the relative distance, the driver perceives the relative distance to be shorter than the actual relative distance by an amount that is greater the longer the actual relative distance. Besides, the driver perceives the relative velocity to be greater than the actual relative velocity by an amount that is greater the greater the host vehicle velocity is. Therefore, as for the vehicle control performed by the vehicle control apparatus as shown in JP-A-2003-208602, the control timing or the control quantity is acquired by using as an input value the actual relative relation that deviates from the relative relation based on the perception of the driver. Therefore, there is a possibility of causing discomfort to the driver.

SUMMARY OF THE INVENTION

The invention proposes a vehicle control apparatus, a vehicle and a vehicle control method that are capable of restraining the discomfort that is caused to a driver by a vehicle control.

A vehicle control apparatus in accordance with a first aspect of the invention is a vehicle control apparatus that controls a vehicle by using as an input value an actual relative physical quantity that shows a relative relation between the vehicle and a perception object that exists outside the vehicle and that is perceivable by a driver of the vehicle, wherein the vehicle is controlled based on a control value that reflects a perceived relative physical quantity that is a physical quantity corresponding to the actual relative physical quantity and that is a relative physical quantity between the vehicle and the perception object which is perceived by the driver.

Besides, in the vehicle control apparatus in accordance with the first aspect, the control value may be related to at least one of a control timing and a control quantity in a control of the vehicle.

Besides, in the vehicle control apparatus in accordance with the first aspect, the actual relative physical quantity may be an actual relative distance between the perception object and the vehicle, and the perceived relative physical quantity may be a perceived relative distance that is a relative distance between the vehicle and the perception object which is perceived by the driver.

Besides, in the vehicle control apparatus in accordance with the first aspect, the perceived relative distance may be smaller than the actual relative distance by an amount that is greater if the actual relative distance is longer.

Besides, in the vehicle control apparatus in accordance with the first aspect, the perceived relative distance may be acquired by using an expression (1) below:

$$Ds = Dr^n \qquad (1)$$

where Ds is the perceived relative distance, Dr is the actual relative distance, and n is in a range of $0 < n < 1$.

Besides, in the vehicle control apparatus in accordance with the first aspect, n in the expression (1) may be in a range of $0.7 \leq n \leq 0.8$.

Besides, in the vehicle control apparatus in accordance with the first aspect, the perceived relative distance is acquired by using an expression (2) below:

$$Ds = \alpha \log(Dr/D0) \qquad (2)$$

where Ds is the perceived relative distance, Dr is the actual relative distance, D0 is a maximum relative distance that is a limit value at which approach of the perception object to the vehicle is not acceptable to the driver of the vehicle, and $\alpha$ is a constant.

A vehicle control apparatus in accordance with a second aspect of the invention is a vehicle control apparatus that controls a vehicle by using as input values an actual relative distance and an actual relative velocity between the vehicle and a perception object that exists outside the vehicle and that is perceivable by a driver of the vehicle, wherein the vehicle is controlled based on a control value that reflects a perceived relative ratio that is a ratio between a perceived relative distance that is a physical quantity corresponding to the actual relative distance and that is a relative distance between the vehicle and the perception object which is perceived by the driver and one of the actual relative velocity and a perceived relative velocity that is a physical quantity corresponding to the actual relative velocity and that shows a relative velocity between the vehicle and the perception object which is perceived by the driver.

Besides, in the vehicle control apparatus in accordance with the second aspect, the control value may be related to at least one of a control timing and a control quantity in a control of the vehicle.

Besides, in the vehicle control apparatus in accordance with the second aspect, if the control value is related to the control timing, the control of the vehicle may be started when the perceived relative ratio exceeds a threshold value.

Besides, in the vehicle control apparatus in accordance with the second aspect, the threshold value may be set based at least one of the driver and a travel environment of the vehicle.

Besides, in the vehicle control apparatus in accordance with the second aspect, if the threshold value is set based on the driver, the threshold value may be set based on the actual relative distance and the actual relative velocity occurring at a time of operation of an operation object that is provided in the vehicle so as to be operated by the driver.

Besides, in the vehicle control apparatus in accordance with the second aspect, the perceived relative distance may be smaller than the actual relative distance by an amount that is greater if the actual relative distance is longer.

Besides, in the vehicle control apparatus in accordance with the second aspect, the perceived relative distance may be acquired by using an expression (1) below:

$$Ds = Dr^n \tag{1}$$

where Ds is the perceived relative distance, Dr is the actual relative distance, and n is in a range of 0<n<1.

Besides, in the vehicle control apparatus in accordance with the second aspect, n in the expression (1) may be in a range of $0.7 \leq n \leq 0.8$.

Besides, in the vehicle control apparatus in accordance with the second aspect, the perceived relative distance may be acquired by using an expression (2) below:

$$Ds = \alpha \log(Dr/D0) \tag{2}$$

where Ds is the perceived relative distance, Dr is the actual relative distance, D0 is a maximum relative distance that is a limit value at which approach of the perception object to the vehicle is not acceptable to the driver of the vehicle, and $\alpha$ is a constant.

A vehicle control apparatus in accordance with a third aspect of the invention is a vehicle control apparatus that controls a vehicle by using as an input value an actual relative distance between the vehicle and a perception object that exists outside the vehicle and that is perceivable by a driver of the vehicle, wherein the vehicle is controlled based on a value that is smaller than the actual relative distance by an amount that is greater if the actual relative distance is longer.

A vehicle in accordance with a fourth aspect of the invention is a vehicle that performs a collision avoidance/mitigation control of at least avoiding a collision of the vehicle with other vehicle that is located in front of the vehicle and that is perceivable by a driver of the vehicle, and mitigating impact when the collision occurs based on an actual relative distance between the vehicle and the other vehicle, wherein the collision avoidance/mitigation control is started more easily when the actual relative distance is relatively long than when the actual relative distance is relatively short.

A vehicle control method in accordance with a fifth aspect of the invention is a vehicle control method of controlling a vehicle by using an input value an actual relative physical quantity that shows a relative relation between the vehicle and an perception object that exists outside the vehicle and that is perceivable by a driver of the vehicle, the method including controlling the vehicle based on a control value that reflects a perceived relative physical quantity that is a physical quantity corresponding to the actual relative physical quantity and that is a relative physical quantity between the vehicle and the perception object which is perceived by the driver.

A vehicle control method in accordance with a sixth aspect of the invention is a vehicle control method of controlling a vehicle by using as input values an actual relative distance and an actual relative velocity between the vehicle and a perception object that exists outside the vehicle and that is perceivable by a driver of the vehicle, the method including controlling the vehicle based on a control value that reflects a perceived relative ratio that is a ratio between a perceived relative distance that is a physical quantity corresponding to the actual relative distance and that is a relative distance between the vehicle and the perception object which is perceived by the driver and one of the actual relative velocity and a perceived relative velocity that is a physical quantity corresponding to the actual relative velocity and that shows a relative velocity between the vehicle and the perception object which is perceived by the driver.

A vehicle control method in accordance with a seventh aspect of the invention is a vehicle control method of controlling a vehicle by using as an input value an actual relative distance between the vehicle and a perception object that exists outside the vehicle and that is perceivable by a driver of the vehicle, the method including controlling the vehicle based on a value that is smaller than the actual relative distance by an amount that is greater if the actual relative distance is longer.

The vehicle control apparatuses and the vehicle control methods in accordance with the foregoing aspects of the invention each perform a vehicle control on the basis of the perceived relative physical quantity that is acquired on the basis of an actual relative physical quantity, so that a vehicle control that agrees with the perception of the driver is performed. Therefore, the discomfort caused to the driver by the vehicle control can be restrained.

Besides, the vehicle control apparatuses and the vehicle control methods in accordance with the foregoing aspects of the invention perform a vehicle control on the basis of the perceived relative ratio that is a ratio between the perceived relative distance acquired on the basis of the actual relative distance and the actual relative velocity, so that a vehicle control that agrees with the perception of the driver is performed. Therefore, the discomfort caused to the driver by the vehicle control can be restrained.

Besides, the vehicle in accordance with the foregoing aspects is more likely to start the collision avoidance/mitigation control when the actual relative distance is relatively long than when the actual relative distance is relatively short, so that the collision avoidance/mitigation control that agrees with the perception of the driver will be performed. Therefore, the discomfort caused to the driver by the collision avoidance/mitigation control can be restrained.

Besides, the vehicle control apparatuses and the vehicle control methods in accordance with the foregoing aspects perform a vehicle control on the basis of a value that is smaller than the actual relative distance by an amount that is greater if the actual relative distance is longer. Therefore, the discomfort caused to the driver by the vehicle control can be restrained.

Besides, according to the foregoing aspects of the invention, if there are a plurality of drivers who driver the vehicle, the threshold value is changed from one to another of the drivers, so that the discomfort caused to each driver by the vehicle control can be restrained.

Besides, according to the foregoing aspects, the threshold value can be changed depending on the travel environment of the vehicle, for example, can be differed between the travel environment in which the driver feels stressed and the travel environment in which the driver does not feel stressed. Thus, the vehicle control can be made to follow changes in the driver's perception of the travel environment of the vehicle, and therefore the discomfort caused to the driver by the vehicle control can be restrained.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

The invention will be described in detail hereinafter with reference to the accompanying drawings. It is to be noted that the embodiments described below do not limit the invention. Besides, the component elements of the embodiments described below include elements that can easily be conceived by a person having ordinary skill in the art, or elements that are substantially the same as elements that can easily be conceived by a person having ordinary skill in the art.

Figure 1:
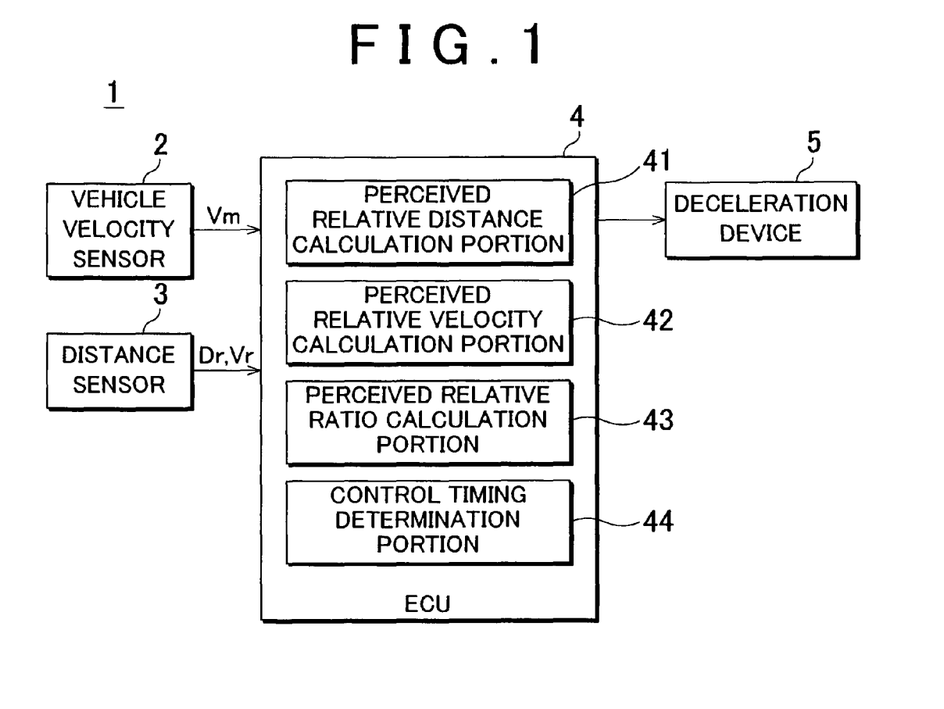
FIG. 1 is a diagram showing an example of a general construction of a vehicle control apparatus in accordance with an embodiment of the invention.
Figure 2:
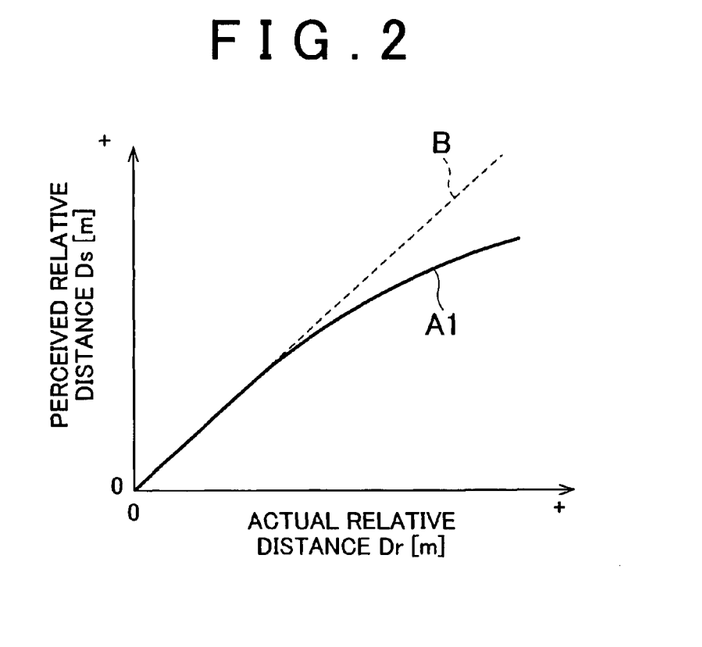
FIG. 2 is a diagram showing a relation between the perceived relative distance and the actual relative distance in accordance with an embodiment of the invention.
Figure 3:
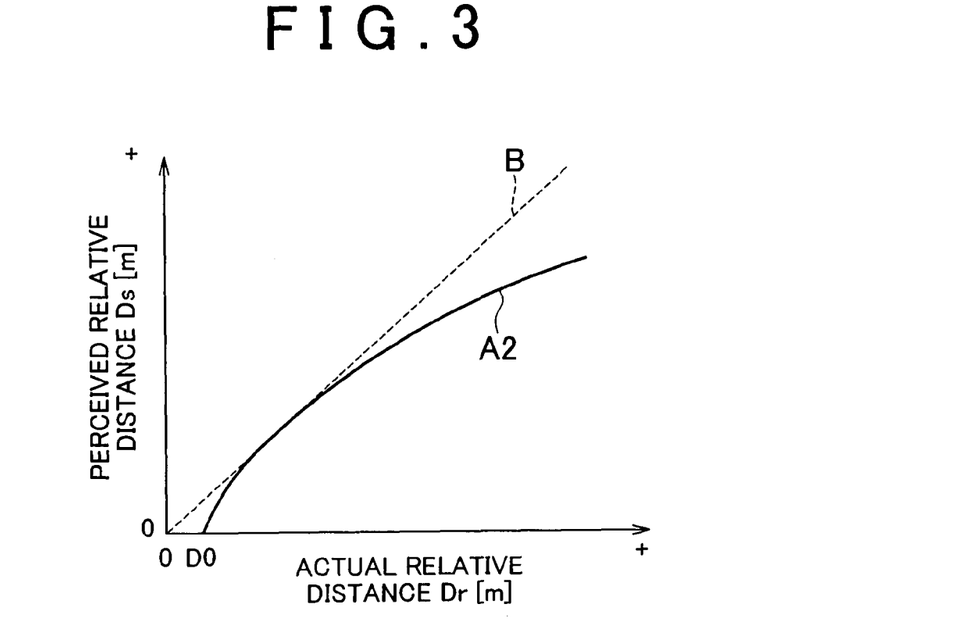
FIG. 3 is a diagram showing another relation between the perceived relative distance and the actual relative distance in accordance with an embodiment of the invention.
Figure 4:
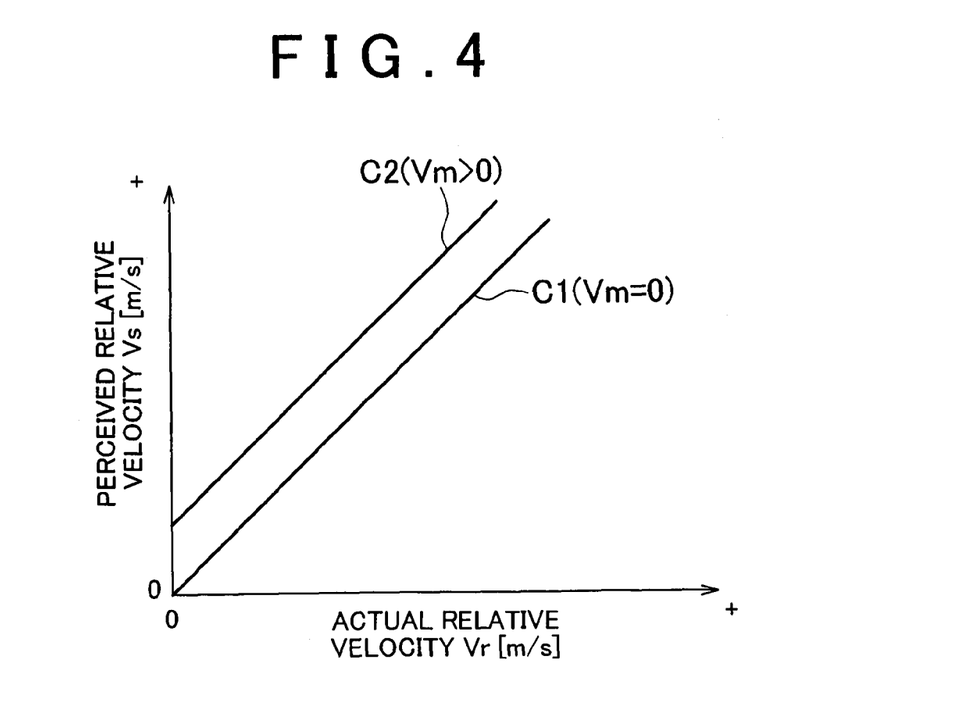
FIG. 4 is a diagram showing a relation between the actual relative velocity and the perceived relative velocity in accordance with an embodiment of the invention.
Figure 5:
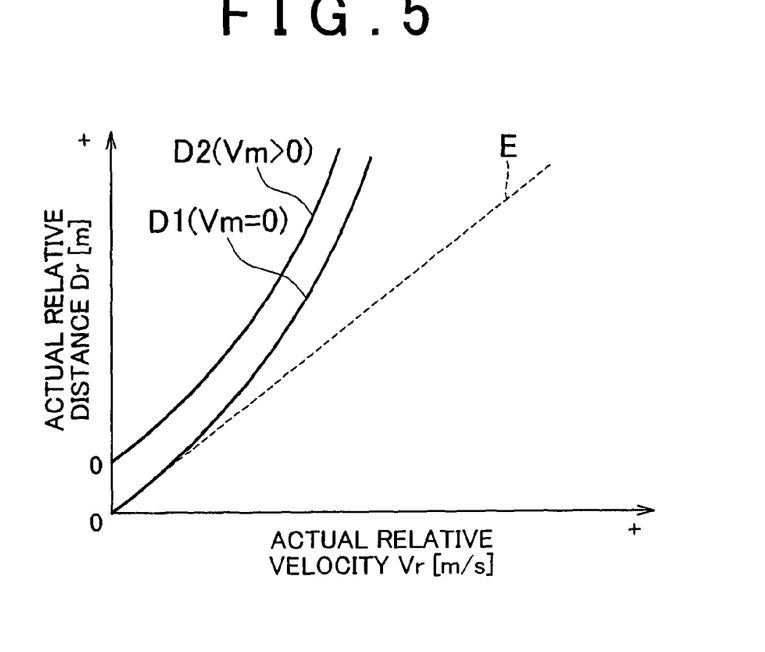
FIG. 5 is a diagram showing a relation between the actual relative distance and the actual relative velocity in accordance with an embodiment of the invention.
Figure 6:
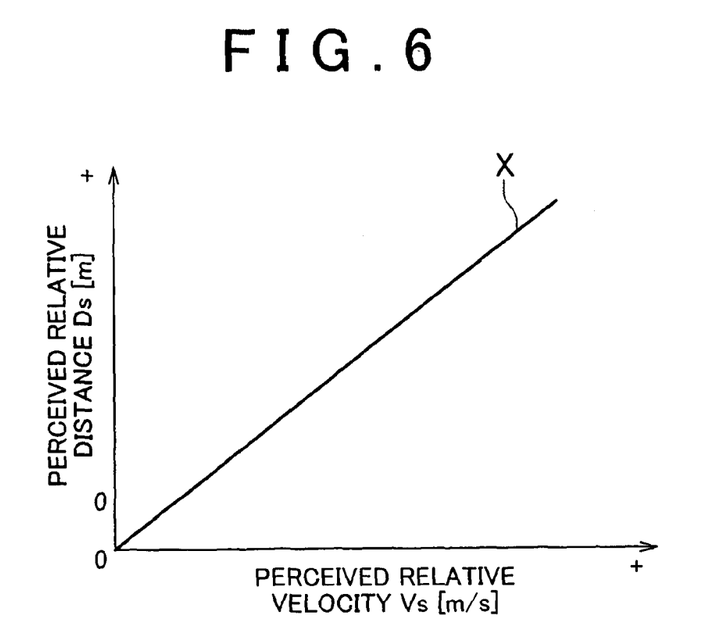
FIG. 6 is a diagram showing a relation between the perceived relative distance and the perceived relative velocity in accordance with an embodiment of the invention.
Figure 7:
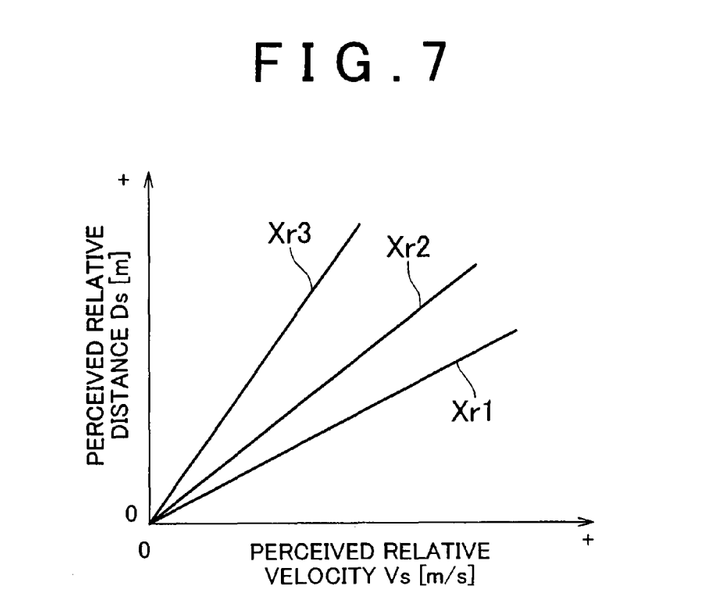
FIG. 7 is a diagram showing relations between the perceived relative distance and the perceived relative velocity with regard to individual drivers in accordance with an embodiment of the invention.
Figure 8:
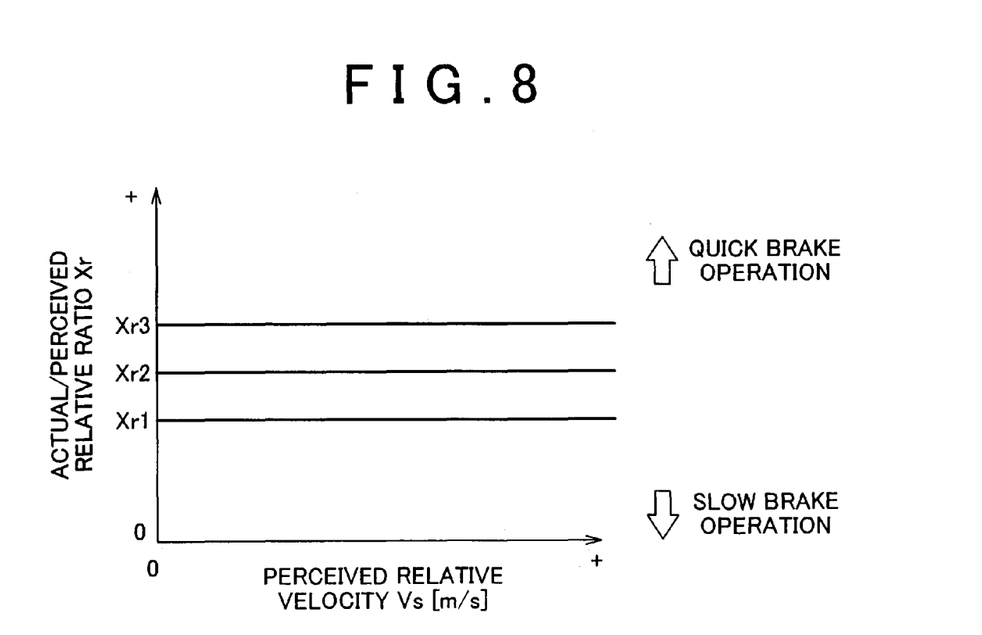
FIG. 8 is a diagram showing relations between the perceived relative velocity and the actual/perceived relative ratio of individual drivers in accordance with an embodiment of the invention.
Figure 9:
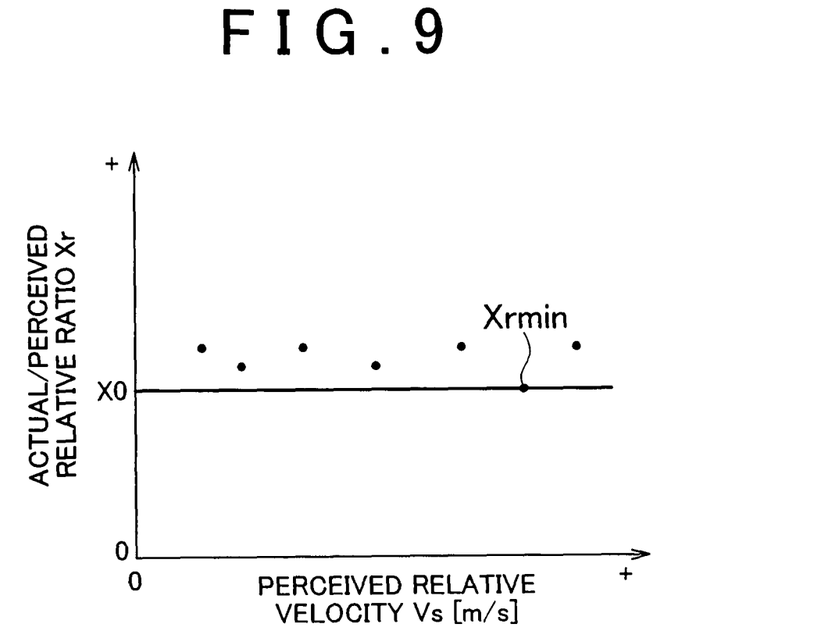
FIG. 9 is a diagram showing a relation between the perceived relative velocity and the actual/perceived relative ratio of a driver in accordance with an embodiment of the invention.

FIG. 1 is a diagram showing an example of a general construction of a vehicle control apparatus in accordance with an embodiment of the invention. FIG. 2 is a diagram showing a relation between the perceived relative distance and the actual relative distance in accordance with an embodiment of the invention. FIG. 3 is a diagram showing another relation between the perceived relative distance and the actual relative distance in accordance with an embodiment of the invention. FIG. 4 is a diagram showing a relation between the perceived relative velocity and the actual relative velocity in accordance with an embodiment of the invention. FIG. 5 is a diagram showing a relation between the actual relative distance and the actual relative velocity in accordance with an embodiment of the invention. FIG. 6 is a diagram showing a relation between the perceived relative distance and the perceived relative velocity in accordance with an embodiment of the invention. FIG. 7 is a diagram showing relations between the perceived relative distance and the perceived relative velocity with regard to individual drivers in accordance with an embodiment of the invention. FIG. 8 is a diagram showing relations between the perceived relative velocity and the actual/perceived relative ratio of individual drivers in accordance with an embodiment of the invention. FIG. 9 is a diagram showing a relation between the perceived relative velocity and the actual/perceived relative ratio of a driver in accordance with an embodiment of the invention.

A vehicle in which a driver rides (hereinafter, simply referred to as "host vehicle CA") is equipped at least with a vehicle control apparatus 1 as shown in FIG. 1. The vehicle control apparatus 1 includes a vehicle velocity sensor 2, a distance sensor 3, an ECU 4, and a deceleration device 5. The vehicle control apparatus 1 controls the vehicle by using as an input value an actual relative physical quantity that shows a relative relation between the host vehicle CA and a perception object TA that exists outside the host vehicle CA and that is perceivable by the driver. It is to be noted herein that a vehicle control in this embodiment is a deceleration control of decelerating the host vehicle CA (including a control of decelerating the vehicle from a state in which the driver is not operating a brake pedal, and a control of further decelerating the vehicle from a state in which the driver is operating the brake pedal). The deceleration control is performed, for example, as a part of a follow-up control, represented by an adaptive cruise control or the like, of causing the host vehicle CA to follow a preceding vehicle that is a perception object TA, or a part of a collision avoidance/mitigation control, represented by a pre-crash safety system, for avoiding a collision of the host vehicle CA with an obstacle (including a moving object and a stationary object) that is a perception object TA located in the traveling direction of the host vehicle CA, for example, the forward direction thereof, or mitigating the impact at the time of the collision. That is, the host vehicle CA in this embodiment performs the deceleration control as a part of the collision avoidance/mitigation control that is intended to avoid a collision of the host vehicle CA with a vehicle that is a perception object TA present ahead of the host vehicle CA, or mitigate the impart at the time of the collision. The perception object TA herein means any object that exists outside the host vehicle CA and that is perceivable by the driver regardless of whether it is directly or indirectly perceivable, and includes moving objects (e.g., vehicles traveling in the surroundings of the host vehicle CA, pedestrians around the host vehicle CA, etc.), and stationary objects (e.g., traffic lights existing around the host vehicle CA (including the present states of traffic lights), traffic signs such as a yield sign and the like, guardrails, structural objects, corners and intersections distinguishable from the foregoing objects, etc.).

The vehicle velocity sensor 2 detects the vehicle velocity Vm [m/s] of the host vehicle CA. The vehicle velocity sensor 2 is connected to the ECU 4. The detected vehicle velocity Vm is output to the ECU 4, and the ECU 4 acquires the vehicle velocity Vm. The acquired vehicle velocity Vm is used by a perceived relative velocity calculation portion 42 (described below) to acquire a perceived relative velocity Vs [m/s]. The vehicle velocity sensor 2 is wheel velocity sensors that are mounted at each of road wheels of the host vehicle CA. The wheel velocity of each wheel detected by a corresponding one of the wheel velocity sensors is output to the ECU 4. On the basis of the wheel velocities of the wheels, the ECU 4 calculates a vehicle velocity Vm of the host vehicle CA, and thus acquires the vehicle velocity Vm. Incidentally, the vehicle velocity sensor 2 is not limited to the foregoing wheel velocity sensors. Besides, instead of acquiring the vehicle velocity Vm from the vehicle velocity sensor 2, it is also permissible to calculate and acquire a vehicle velocity Vm of the host vehicle CA on the basis of the sensor-detected rotation velocity of a rotating body that is a part of a power transmission path or the like that transmits the motive power generated by a motive power source (e.g., an engine, an electric motor, etc.) of the host vehicle CA, or on the basis of the position data about the host vehicle CA which is detected by a sensor represented by the GPS.

The distance sensor 3 detects the actual relative distance Dr [m] that is an actual relative distance between the host vehicle CA and the perception object TA. The distance sensor 3 is connected to the ECU 4, so that the detected actual relative distance Dr is output to the ECU 4, and the ECU 4 acquires the actual relative distance Dr. The acquired actual relative distance Dr is used by a perceived relative distance calculation portion 41 (described below) to acquire the perceived relative distance Ds [m]. The distance sensor 3 in this embodiment is a millimeter wave radar that detects the actual relative distance Dr and the actual relative velocity Vr [m/s] of the perception object TA that are relative physical quantities that show a relative relation between the host vehicle CA and the perception object TA, by a detection method that uses millimeter waves. The millimeter wave radar is mounted, for example, in a central portion of a front face portion of the host vehicle CA, for example, within a front grille. The millimeter wave radar emits millimeter waves from the front face of the host vehicle CA into a predetermined range in the traveling direction of the host vehicle CA, and receives millimeter waves reflected from a perception object TA that exists in the traveling direction of the host vehicle CA. Then, the millimeter wave radar detects the actual relative distance Dr by measuring the time from the emission until the reception of the millimeter waves and calculating the distance from the host vehicle CA or the millimeter wave radar to the perception object TA, and then outputs the detected actual relative distance Dr to the ECU 4. Besides, the millimeter wave radar, using the Doppler effect, detects the actual relative velocity Vr by calculating a velocity difference between the vehicle velocity Vm of the host vehicle CA equipped with the millimeter wave radar and the vehicle velocity Vt of the perception object TA that exists in the traveling direction of the host vehicle CA, and then outputs the detected actual relative velocity Vr to the ECU 4. Incidentally, the distance sensor 3 is not limited to the millimeter wave radar, but may also be, for example, a radar that uses laser, infrared rays, etc., or an image recognition device that calculates the actual relative distance Dr on the basis of data about images of views in the traveling direction of the host vehicle CA which are shot by an image pickup device such as a CCD camera or the like, etc. Besides, in the case where the actual relative velocity Vr cannot be detected by the distance sensor 3, the ECU 4 may also calculate and acquire the actual relative velocity Vr on the basis of the vehicle velocity Vm detected by the vehicle velocity sensor 2 and the actual relative distance Dr detected by the distance sensor 3. In this case, the detected actual relative distance Dr is used by the ECU 4 to acquire the actual relative velocity Vr.

The ECU 4 performs the vehicle control on the basis of a control value that reflects a perceived relative physical quantity that is a physical quantity corresponding to the actual relative physical quantity, which is an input value, and that is also a relative physical quantity between the host vehicle CA and the perception object TA which is based on perception of the driver. The ECU 4 in this embodiment acquires a perceived relative distance Ds that is the relative distance between the vehicle and the perception object according to the perception of by the driver, on the basis of the actual relative distance Dr, which is an input value. Besides, in this embodiment, the ECU 4 acquires a perceived relative velocity Vs that is the relative velocity between the host vehicle CA and the perception object TA according to perception of the driver, on the basis of the actual relative velocity Vr, which is an input value. Besides, the ECU 4 acquires a perceived relative ratio X that is a perception-related computed value, on the basis of the acquired perceived relative distance Ds and the acquired perceived relative velocity Vs. That is, the ECU 4 in this embodiment performs the vehicle control on the basis of the control value that reflects the perceived relative ratio X that is a ratio between the perceived relative distance Ds and the perceived relative velocity Vs. The ECU 4 has functions as a perceived relative distance calculation portion 41, a perceived relative velocity calculation portion 42, a perceived relative ratio calculation portion 43, and a control timing determination portion 44. Incidentally, the hardware construction of the ECU 4 is made up of a CPU (central processing unit) that mainly performs computation processes, a memory that stores programs and information (RAM such as an SRAM or the like, a ROM (read-only memory) such as an EEPROM or the like), input/output interfaces, etc. Thus, the hardware construction of the ECU 4 is substantially the same as ECUs that are mounted in existing vehicles, and therefore will not be described in detail below.

The perceived relative distance calculation portion 41 acquires the perceived relative distance Ds on the basis of the acquired actual relative distance Dr. The driver of the host vehicle CA is subject to a false perception that the longer the actual relative distance Dr, the more greatly the relative distance appears to be shorter than the actual relative distance Dr. For example, when the driver sees utility poles that are placed at equal intervals in the travelling direction of the host vehicle CA, the farther utility poles are located, the smaller the intervals between the utility poles appear to be, so that the driver falsely perceives the positions of far utility poles to be nearer than their actual positions. Therefore, if the vehicle control is performed on the basis of the acquired actual relative distance Dr, there is possibility that, for example, if the actual relative distance Dr is long, the vehicle control may be performed with a control timing and a control quantity that are different from those of the operation of the vehicle (an operation timing and an amount of operation) based on the perception of the driver of the host vehicle CA. Therefore, in order to change the relative distance that is a relative physical quantity that shows a relative relation between the perception object TA and the host vehicle CA that can be perceived by the driver to a value based on the driver's perception, the perceived relative distance calculation portion 41 calculates the perceived relative distance Ds so that the calculated value is smaller than the actual relative distance Dr by an amount that is greater the longer the acquired actual relative distance Dr is. In this embodiment, the perceived relative distance calculation portion 41 calculates the perceived relative distance Ds on the basis of the acquired actual relative distance Dr, by using the expression (3) below. In the expression (3), n is in the range of 0<n<1. Besides, n is preferred to be about 0.7 to 0.8.

$$Ds = Dr^n \qquad (3)$$

As shown in FIG. 2, the perceived relative distance Ds, which is calculated from the acquired actual relative distance Dr by using the foregoing expression (3), becomes smaller than the acquired actual relative distance Dr by an amount that is greater the longer the acquired actual relative distance Dr (as shown by a curve A1 in FIG. 2), in comparison with the case where the acquired actual relative distance Dr is used directly as the perceived relative distance Ds (as shown by a straight line B in FIG. 2). That is, by performing the vehicle control on the basis of a control value that reflects the perceived relative distance Ds, the vehicle control that agrees with the perception of the driver of the host vehicle CA can be performed. Therefore, the vehicle control performed by the vehicle control apparatus 1 agrees with the driver's sensation, and therefore the discomfort caused to the driver by the vehicle control can be restrained.

Herein, as for the false perception of the relative distance by the driver of the host vehicle CA, it is permissible to take into account the maximum relative distance D0 [m] that is a limit value at which approach of the perception object TA to the host vehicle CA is not acceptable to the driver. That is, if the perceived relative distance Ds is calculated so as to be smaller than the acquired actual relative distance Dr by an amount that is greater the longer the actual relative distance Dr is, and so as not to become less than the maximum relative distance D0, and if the vehicle control is performed on the basis of the perceived relative distance Ds calculated in that manner, the discomfort caused to the driver by the vehicle control can be restrained.

For example, the perceived relative distance Ds may be calculated from the acquired actual relative distance Dr, and the maximum relative distance D0 [m] that is a limit value at which the approach of the perception object TA to the host vehicle CA is not acceptable to the driver, by using the expression (4) below. The maximum relative distance D0 is preferred to be about 4 m. The constant α in the expression (4) is preferred to be about 20. Incidentally, the maximum relative distance D0 may be set beforehand as a constant value, or may also be set separately for individual drivers of the host vehicle CA.

$$Ds = \alpha \log(Dr/D0) \tag{4}$$

As shown in FIG. 3, the perceived relative distance Ds, which is calculated from the acquired actual relative distance Dr and the set maximum relative distance D0 by using the foregoing expression (4), becomes smaller than the acquired actual relative distance Dr by an amount that is greater the longer the actual relative distance Dr is, and does not become less than the maximum relative distance D0 (as shown by a curve A2 in FIG. 3), in comparison with the case where the acquired actual relative distance Dr is directly used as the perceived relative distance Ds (as shown by a straight line B in FIG. 3). That is, if the vehicle control is performed on the basis of the perceived relative distance Ds that is a perceived relative physical quantity, it is possible to perform the vehicle control with a control timing and a control quantity that agree with the perception of the driver of the host vehicle CA. Therefore, the vehicle control performed by the vehicle control apparatus 1 agrees with the driver's sensation, and the discomfort caused to the driver by the vehicle control can be further restrained.

The perceived relative velocity calculation portion 42 acquires the perceived relative velocity Vs on the basis of the acquired actual relative velocity Vr. The driver of the host vehicle CA falsely perceives the relative velocity to be greater than the actual relative velocity Vr by an amount that is greater the greater the vehicle velocity Vm of the host vehicle CA is. As shown in FIG. 4, the perceived relative velocity Vs (shown by a straight line C1 in FIG. 4) for an arbitrary actual relative velocity Vr when the host vehicle CA is at rest (Vm=0) is different from the perceived relative velocity Vs (shown by a straight line C2 in FIG. 4) for an arbitrary actual relative velocity Vr when the host vehicle CA is traveling (Vm>0). For example, the case where the host vehicle CA is traveling on an ordinary road at about 40 km/h and the case where the host vehicle CA is traveling on an expressway at 100 km/h will be considered. If the actual relative distance Dr is fixed, the driver falsely perceives the relative velocity to be greater in the case where the host vehicle CA is traveling on a highway than in the case where the host vehicle CA is traveling on an ordinary road. Therefore, if the vehicle control is performed on the basis of the acquired actual relative velocity Vr, there is a risk that the vehicle control may be performed with a control timing and a control quantity that do not match the operation of the host vehicle CA (the operation timing and the operation amount) based on the perception of the driver of the host vehicle CA, for example, when the vehicle velocity Vm of the host vehicle CA is great. Therefore, in order that the relative velocity that is a relative physical quantity that shows a relative relation between the perception object TA perceivable by the driver and the host vehicle CA be caused to become a value based on the perception of the driver, the perceived relative velocity calculation portion 42 calculates the perceived relative velocity Vs so that the calculated perceived relative velocity Vs is greater than the actual relative velocity Vr by an amount that is greater the greater the acquired vehicle velocity Vm of the host vehicle CA is. In this embodiment, the perceived relative velocity calculation portion 42 calculates the perceived relative velocity Vs from the acquired actual relative velocity Vr and the acquired the acquired vehicle velocity Vm of the host vehicle CA, by using the expression (5) below. In the expression (5), β is within the range of 0<β<1. Besides, β is preferred to be about 0.2. Incidentally, in this embodiment, the actual relative velocity Vr is defined as being positive in the direction in which the perception object TA and the host vehicle CA approach each other.

$$Vs = Vr + \beta Vm \tag{5}$$

The perceived relative velocity Vs, which is calculated from the acquired actual relative velocity Vr and the acquired vehicle velocity Vm of the host vehicle CA by using the expression (5), is greater than the acquired actual relative velocity Vr by an amount that is greater the greater the vehicle velocity Vm of the host vehicle CA is (see the straight lines C1 and C2 in FIG. 4). That is, by performing the vehicle control on the basis of the control value that reflects the perceived relative velocity Vs that is a perceived relative physical quantity, that is, on the basis of the perceived relative velocity Vs, it is possible to perform a vehicle control that agrees with the perception of the driver of the host vehicle CA. Therefore, the vehicle control performed by the vehicle control apparatus 1 agrees with the driver's sensation, and therefore the discomfort caused to the driver by the vehicle control can be restrained.

The false perception of the relative velocity by the driver of the host vehicle CA is caused mainly by the vehicle velocity Vm of the host vehicle CA, and is also caused by the relative acceleration between the perception object TA and the host vehicle CA which is a relative physical quantity. That is, if a perceived relative velocity Vs is calculated on the basis of the actual relative velocity Vr, the vehicle velocity Vm of the host vehicle CA and an actual relative acceleration Ar (m/s$^2$), and if the vehicle control is performed on the basis of the calculated perceived relative velocity Vs, the discomfort caused to the driver by the vehicle control can be further restrained.

For example, the perceived relative velocity Vs may also be calculated from the acquired actual relative velocity Vr, the acquired vehicle velocity Vm of the host vehicle CA, and the actual relative acceleration Ar, by using the expression (6) below. In the expression (6), δ is in the range of 0<δ<3. Besides, δ is preferred to be about 1.0. Incidentally, in this embodiment, the actual relative acceleration Ar is defined as being positive in the direction in which the perception object TA and the host vehicle CA approach each other. Incidentally, the actual relative acceleration Ar can be calculated by the ECU 4 from the actual relative distance Dr, the vehicle velocity Vm of the host vehicle CA, the actual relative velocity Vr, the calculated or sensor-detected acceleration of the host vehicle CA, etc.

$$Vs = Vr + \beta Vm + \delta Ar \quad (6)$$

Besides, the perceived relative velocity Vs may also be calculated from the acquired actual relative velocity Vr, the acquired vehicle velocity Vm of the host vehicle CA, and the acceleration Ap the perception object TA, by using the expression (7) below. A relative acceleration that can be a cause of the false perception of the relative velocity by the driver of the host vehicle CA is the acceleration Ap of the perception object TA that changes irrespective of the operation performed by the driver, particularly, the acceleration Ap whose sign is minus (e.g., the acceleration in the case where the preceding vehicle ahead of the host vehicle CA decelerates, and the like), that is, the acceleration Ap in the direction of approach to the host vehicle CA. Therefore, the actual relative acceleration Ar may also be substituted with the acceleration Ap of the perception object TA. In the expression (7), γ is in the range of 0.5 to 2. Besides, γ is preferred to be about 1.5. Incidentally, in this embodiment, the acceleration Ap of the perception object TA is defined as being positive in the direction in which the perception object TA and the host vehicle CA approach each other. Incidentally, the acceleration Ap of the perception object TA can be calculated by the ECU 4 from the actual relative distance Dr, the vehicle velocity Vm of the host vehicle CA, the actual relative velocity Vr, the calculated or sensor-detected acceleration of the host vehicle CA, etc.

$$Vs = Vr + \beta Vm + \gamma Ap \quad (7)$$

The perceived relative ratio calculation portion 43 acquires the perceived relative ratio X that is a perceived computed value that is acquired on the basis of the perceived relative velocity Vs. In this embodiment, the perceived relative ratio calculation portion 43 calculates a ratio between the perceived relative distance Ds acquired by the perceived relative distance calculation portion 41 and the perceived relative velocity Vs acquired by the perceived relative velocity calculation portion 42, as the perceived relative ratio X. Herein, the perceived relative ratio X is the perceived relative distance Ds divided by the perceived relative velocity Vs. As described above, the driver of the host vehicle CA is subject to false perception of relative physical quantities, such as the relative distance, the relative velocity, etc. As shown in FIG. 5, the relation between the actual relative distance Dr and the actual relative velocity Vr when the host vehicle CA is operated on the basis of the perception of the driver of the host vehicle CA (e.g., at the time of operation of a brake pedal (not shown) that is an operation object that is provided in the host vehicle CA so as to be operated by the driver) varies depending on the vehicle velocity Vm of the host vehicle CA, and is not constant even when the vehicle velocity Vm of the host vehicle CA is fixed (as shown by a curve D1 (Vm=0) and a curve D2 (Vm>0) shown in FIG. 5). Therefore, if the vehicle control is performed with the actual relative ratio Y between the acquired actual relative distance Dr and the acquired actual relative velocity Vr being constant (as shown by a straight line E in FIG. 5), there is possibility that the vehicle control may be performed with a control timing and a control quantity that are different from the operation of the vehicle (the operation timing and the operation amount) of the vehicle that are based on the perception of the driver of the host vehicle CA. Therefore, the perceived relative ratio calculation portion 43 calculates the perceived relative ratio X that is the ratio between the perceived relative distance Ds and the perceived relative velocity Vs, in order that the relative ratio that is the ratio between the relative distance and the relative velocity that are relative physical quantities that show a relative relation between the host vehicle CA and the perception object TA perceivable by the driver be caused to be a value based on the perception of the driver. The perceived relative ratio X is a constant value if the driver is fixed, as shown in FIG. 6. That is, the driver of the host vehicle CA operates the host vehicle CA so that the relative ratio, that is, the time that is taken until the perception object TA and the host vehicle CA approach each other, is constant. Therefore, the use of the perceived relative ratio X in the vehicle control makes it possible to perform the vehicle control that agrees with the perception of the driver of the host vehicle CA despite changes in the parameters that are used to calculate the perceived relative ratio X, for example, the relative distance, the relative velocity, the vehicle velocity Vm of the host vehicle CA, the relative acceleration, and the acceleration Ap of the perception object TA. Therefore, the vehicle control performed by the vehicle control apparatus 1 agrees with the driver's sensation, and therefore the discomfort caused to the driver by the vehicle control can be restrained.

The control timing determination portion 44 performs the vehicle control on the basis of a control value that reflects the perceived relative physical quantity. In this embodiment, the control timing determination portion 44 performs the vehicle control on the basis of the control value that reflects the perceived relative ratio X. The control timing determination portion 44 sets the perceived relative ratio X based on the perceived relative distance Ds and the perceived relative velocity Vs that are perceived relative physical quantities as a control value regarding the control timing of the deceleration control, and determines the control timing of the deceleration control on the basis of the control value. That is, in this embodiment, since the control timing is determined on the basis of the control value that reflects the perceived relative ratio X (based on the perceived relative distance Ds and the perceived relative velocity Vs) is used, that is, on the basis of the perceived relative ratio X, the deceleration control can be performed with the control timing that agrees with the perception of the driver of the host vehicle CA. The control timing determination portion 44 determines whether or not the perceived relative ratio X calculated by the perceived relative ratio calculation portion 43 (the control value that reflects the perceived relative ratio X) is greater than a threshold value X0. If determining that the perceived relative ratio X is greater than the threshold value X0 (i.e., determining that the perceived relative ratio X is less than or equal to the threshold value X0, in the case of the deceleration control), the control timing determination portion 44 starts the deceleration control.

It is to be noted herein that the threshold value X0 may be set as a constant value in advance, or may also be changed on the basis of at least one of the driver (such as individuality or characteristic of the driver) and the environment in which the host vehicle CA is traveling. In the case where the threshold value X0 is a constant value, in this embodiment, separately for each driver, the actual relative distance Dr and the actual relative velocity Vr at the time of operation of the brake pedal of the host vehicle CA are sampled while changes are made in the relative distance, the relative velocity, the vehicle velocity Vm of the host vehicle CA, the relative acceleration, and the acceleration Ap of the perception object TA in various manners, and actual perceived relative ratios Xr can be calculated on the basis of the sampled values, and the threshold value X0 can be set beforehand on the basis of the average value of the actual perceived relative ratios Xr, or the like.

Besides, in the case where the threshold value X0 is changed on the basis of the driver of the host vehicle CA, the changing is performed on the basis of the actual relative distance Dr and the actual relative velocity Vr occurring at the time of operation of an operation object that is provided in the host vehicle CA so as to be operated by the driver. The operation of the brake pedal, that is, the timing of brake operation, differs from one driver to another. Therefore, as shown in FIG. 7, the perceived relative velocity Vs at a fixed perceived relative distance Ds differs from one driver to another, and the timing of brake operation of each driver is represented by the gradient of a straight line (Xr1, Xr2, Xr3 in FIG. 7) that shows the relation between the perceived relative distance Ds and the perceived relative velocity Vs. That is, the actual/perceived relative ratio Xr is a constant value for each driver, but differs in value depending on the velocity of the brake operation, as shown in FIG. 8. A driver who is quick in brake operation has a larger actual/perceived relative ratio Xr than a driver who is slow in brake operation. Therefore, in this embodiment, the threshold value X0 is set separately for each driver so as to correspond to a plurality of drivers that drive the host vehicle CA, and is changed according to different drivers that drive the host vehicle CA. Therefore, even if there are a plurality of drivers who drive the host vehicle CA, the threshold value X0 is changed according to the individual drivers, so that the discomfort to the driver can be restrained.

The setting of the threshold value X0 separately for each driver is performed as follows. For example, the actual relative distance Dr and the actual relative velocity Vr at the time of operation of the brake pedal of the host vehicle CA are sampled while changes are made in the relative distance, the relative velocity, the vehicle velocity Vm of the host vehicle CA, the relative acceleration, the acceleration Ap of the perception object TA in various manners, and a plurality of actual perceived relative ratios Xr are calculated for each driver on the basis of results of the sampling. Then, a lower limit value Xrmin of the actual/perceived relative ratio Xr for a driver is set as a threshold value X0 for the driver as shown in FIG. 9. Besides, the threshold value X0 may also be set on the basis of the quickness of brake operation. For example, a threshold value X0$f$ for drivers who are quick in brake operation may be set beforehand on the basis of the actual/perceived relative ratio Xr of drivers who are quick in brake operation, and a threshold value X0$m$ for drivers who are ordinary in the quickness of brake operation may be set beforehand on the basis of the actual/perceived relative ratio Xr of drivers who are ordinary in the quickness of brake operation, and a threshold value X0$s$ for drivers who are slow in brake operation may be set beforehand on the basis of the actual/perceived relative ratio Xr of drivers who are slow in brake operation. Then, the threshold value X0 is set at one of the values X0$f$, X0$m$ and X0$s$ according to each driver.

Besides, in the case where the threshold value X0 is changed on the basis of the environment in which the host vehicle CA is traveling, the changing is performed on the basis of the level of stress that the driver feels according to the environment of the traveling of the host vehicle CA. The threshold value X0 of the perceived relative ratio X is more likely to be exceeded in the case where the driver feels great stress than in the case where the driver feels small stress. Therefore, in the case of the deceleration control, the threshold value X0 is made larger. The environment of the traveling of the host vehicle CA includes the kind of road on which the host vehicle CA is traveling, the situation regarding the crowdedness of the road, the situation regarding the road surface, the weather, the visibility, etc. For example, the threshold value X0 is set larger if the road on which the host vehicle CA is traveling is a local road, a congested road, or a slippery road, or is under a bad weather, or has a poor visibility. That is, the threshold value X0 can be changed on the basis of the environment of the traveling of the host vehicle CA, the level of stress of the driver. Therefore, it is possible to cause the vehicle control to follow changes in the driver's perception of the environment of the traveling of the host vehicle CA, and to prevent or reduce the discomfort caused to the driver.

The deceleration device 5 actually performs the vehicle control. In this embodiment, the deceleration device 5 performs a deceleration control of decelerating the host vehicle CA. The deceleration device 5 in this embodiment is a brake device that applies to the host vehicle CA the braking force that is generated by the driver's operation of the brake pedal. After it is determined by the control timing determination portion 44 that the perceived relative ratio X is less than or equal to the threshold value X0, the deceleration device 5 starts the deceleration control on the basis of a control quantity, for examples, the deceleration, the braking force, etc. Therefore, the deceleration device 5 decelerates the host vehicle CA on the basis of the control quantity. As described above, the control timing is determined on the basis of the perceived relative ratio X (or a control value that reflects the perceived relative ratio X) and the deceleration control is started at the thus-determined control timing. Therefore, the vehicle control apparatus 1 performs the vehicle control on the basis of the control values that reflect the perceived relative distance Ds and the perceived relative velocity Vs, each of which is a perceived relative physical quantity. Therefore, since the vehicle control apparatus 1 performs the vehicle control on the basis of the control value that reflects the perceived relative distance Ds, the vehicle control is performed on the basis of a value that is smaller than the actual relative distance Dr by a difference amount that is greater the longer the actual relative distance Dr is. Incidentally, the control quantities are acquired by the ECU 4 on the basis of the state of operation of the host vehicle CA (the actual relative distance Dr, the actual relative velocity Vr, the vehicle velocity Vm of the host vehicle CA, etc.). The methods of acquiring the control quantities are known to public, and the description thereof will be omitted. Besides, the deceleration device 5 is not limited to the brake device, but may be any device as long as the device decelerates the host vehicle CA by decreasing the drive force that occurs on the host vehicle CA, for example, by producing braking force or the like. Examples of the deceleration device include the engine mounted in the host vehicle CA (the engine is able to decelerate the host vehicle CA by decreasing the output thereof through the output control), the transmission disposed on the power transmission path of the host vehicle CA (the transmission is able to decelerate the host vehicle CA since it is able to transmit the output force of the engine to the driving wheels after changing the force through the velocity change ratio shift control, and is able to change the friction that the engine generates during the fuel cut), the electric motor that is mounted as a power source in the host vehicle CA (the electric motor is able to decelerate the host vehicle CA by performing the regenerative braking through the drive control), an accessory or the like that is driven by output of the engine (the accessory or the like is able to decelerate the host vehicle CA by increasing the load given to the engine through the drive control), etc. Besides, the brake device and the foregoing devices (such as the engine, the motor, the accessories, etc.) may be combined to form a deceleration device 5.

Figure 10:
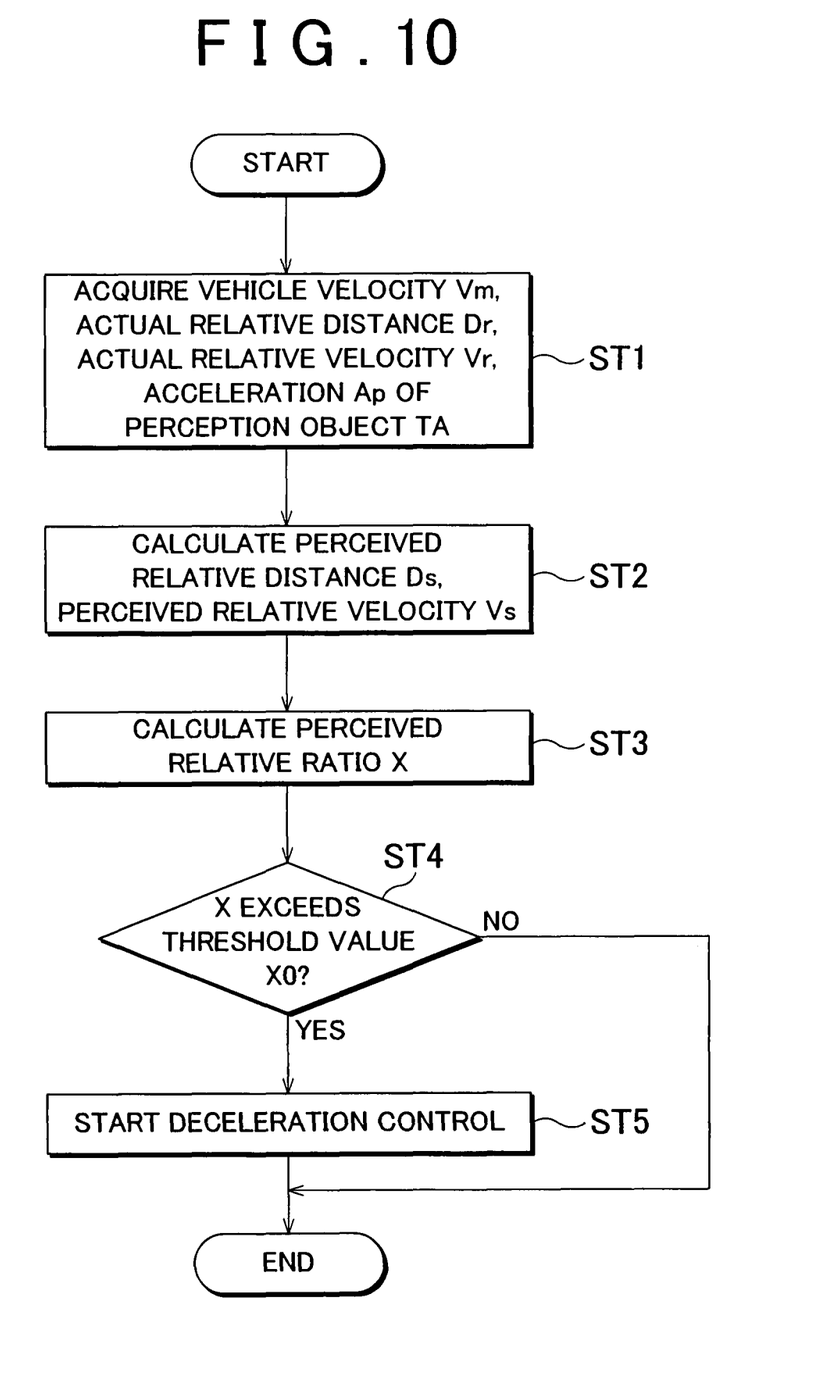
FIG. 10 is a flowchart showing a vehicle control method performed by a vehicle control apparatus in accordance with an embodiment of the invention.

Next, the vehicle control method employed by the vehicle control apparatus 1 will be described. FIG. 10 is a control flowchart showing a vehicle control method of the vehicle control apparatus in accordance with the embodiment. Incidentally, the vehicle control method of the vehicle control apparatus 1 is realized by, for example, the ECU 4 executing vehicle control programs that are stored beforehand. Besides, the vehicle control program is executed at predetermined control period. Therefore, the vehicle control method of the vehicle control apparatus 1 is repeatedly performed while the host vehicle CA is traveling.

Firstly, the ECU 4 of the vehicle control apparatus 1, as shown in FIG. 10, acquires the vehicle velocity Vm of the host vehicle CA, the actual relative distance Dr, the actual relative velocity Vr, and the acceleration Ap of the perception object TA as described above (step ST1).

Next, the perceived relative distance calculation portion 41 calculates the perceived relative distance Ds, and the perceived relative velocity calculation portion 42 calculates the perceived relative velocity Vs (step ST2). In this embodiment, the perceived relative distance calculation portion 41 calculates the perceived relative distance Ds, for example, from the acquired actual relative distance Dr by using the foregoing expression (3). Besides, the perceived relative velocity calculation portion 42 calculates the perceived relative velocity Vs, for example, from the acquired actual relative velocity Vr, the acquired vehicle velocity Vm of the host vehicle CA, and the acceleration Ap of the perception object TA, by using the foregoing expression (7).

Next, the perceived relative ratio calculation portion 43 calculates the perceived relative ratio X (step ST3). In this embodiment, the perceived relative ratio calculation portion 43 performs the calculation as in (the perceived relative distance Ds)/(the perceived relative velocity Vs)=(the perceived relative ratio X).

Next, the control timing determination portion 44 determines whether or not the perceived relative ratio X is greater than the threshold value X0 (step ST4). In this embodiment, the control timing determination portion 44 determines whether or not the perceived relative ratio X is less than or equal to the threshold value X0, so as to determine whether or not the deceleration control is able to be started on the basis of the perceived relative ratio X.

Next, the ECU 4, if determining that the perceived relative ratio X is greater than the threshold value X0 via the control timing determination portion 44 (affirmative determination in step ST4), starts the deceleration control (step ST5). In this embodiment, if a condition for starting the deceleration control on the basis of the perceived relative ratio X is met, the ECU 4 executes the deceleration control on the basis of the control quantities that are acquired by the ECU 4. Therefore, the vehicle control apparatus 1 performs the vehicle control on the basis of the value that is smaller than the actual relative distance Dr by an amount that is greater the longer the actual relative distance Dr. For example, if the host vehicle CA performs the collision avoidance/mitigation control, the collision avoidance/mitigation control is more likely to be started when the actual relative distance Dr is long than when the actual relative distance Dr is short. Incidentally, if it is determined by the control timing determination portion 44 that the perceived relative ratio X is not greater than the threshold value X0 (negative determination in step ST4), the ECU 4 ends the present control period, and proceeds to the next execution of the deceleration control.

Thus, in the vehicle control apparatus 1, and the vehicle control method performed by the vehicle control apparatus 1 in accordance with the embodiment, the deceleration control of the vehicle control is started on the basis of the control value that reflects the perceived relative physical quantity that corresponds to the actual relative physical quantity, that is, the perceived relative ratio X based on both the perceived relative distance Ds acquired on the basis of the actual relative distance Dr and the perceived relative velocity Vs acquired on the basis of the actual relative velocity Vr (the control value that reflects the perceived relative ratio X). Therefore, the control timing of the deceleration control that agrees with the driver's perception is obtained, so that the deceleration control that agrees with the driver's perception is performed. Therefore, the discomfort caused to the driver by the deceleration control can be restrained. It is to be noted herein if the perceived relative velocity Vs is great, the driver operates the vehicle on the basis of the perceived relative velocity Vs, and that if the perceived relative velocity Vs becomes small, the driver controls the vehicle on the basis of the perceived relative distance Ds. Therefore, since the vehicle control is performed on the basis of the perceived relative ratio X, that is, a relation between the perceived relative distance Ds and the perceived relative velocity Vs, the vehicle control can be caused to agree with the driver's sensation in operating the vehicle operation.

Incidentally, the vehicle control is not limited to the deceleration control as in the foregoing embodiment, but may be any vehicle control as long as the vehicle control is performed on the basis of a relative physical quantity (relative distance, relative velocity). For example, the vehicle control may be an acceleration control of accelerating the host vehicle CA (including a control in which the vehicle is accelerated from a state in which the accelerator pedal is not operated by the driver, and a control in which the vehicle is further accelerated from a state in which the accelerator pedal is operated by the driver), or may also be a turning or cornering control of turning the host vehicle CA (including a control in which the vehicle is turned from a state in which the steering wheel is not operated by the driver, and a control in which the vehicle is further turned from a state in which the steering wheel is operated by the driver). The acceleration control and the turning control are performed, for example, as a part of the foregoing follow-up control, a part of the corning control of maintaining the vehicle in the lane in which the host vehicle CA is presently traveling, or a part of the foregoing collision avoidance/mitigation control.

Besides, the vehicle control is not limited to the control of changing the state of traveling of the host vehicle CA as described above, but may also be a warning control of producing a warning to the driver or to an external device or the like that is provided outside the host vehicle CA. For example, the control of producing a warning may be started when it is determined that the perceived relative ratio X exceeds the threshold value X0.

Besides, the vehicle control may also be performed as a part of the collision avoidance/mitigation control. For example, if it is determined that the perceived relative ratio X exceeds the threshold value X0, it is also permissible to start a control for avoiding the collision of the host vehicle CA (e.g., a control of producing an alarm, a control of returning the accelerator pedal that is being operated by the driver, a control of increasing the pedal reaction force of the accelerator pedal, etc.). Besides, if it is determined that the perceived relative ratio X exceeds the threshold value X0, it is also permissible to start a control for reducing the impact at the time of collision of the host vehicle CA (e.g., a control of winding up the seatbelt in order to fasten the seatbelt closely on the occupant, a control of increasing the braking force that the deceleration device 5 generates, a control of increasing in advance the braking pressure for generating the braking force in order for the deceleration device 5 to quickly generate braking force).

Besides, the acquisition method for the actual relative distance Dr and the actual relative velocity Vr performed by the ECU 4 is not limited to what has been described above in conjunction with the embodiment. For example, the ECU 4 of the host vehicle CA may also acquire perception object data that includes position data about the perception object TA, the vehicle velocity Vt thereof, etc., and may acquire the actual relative distance Dr and the actual relative velocity Vr by calculating them on the basis of the acquired perception object data, and host vehicle data that includes position data about the host vehicle CA, the vehicle velocity Vm thereof, etc. The acquisition of the perception object data, if the perception object TA is a structural object, is preferred to be performed by using map data stored in the navigation system mounted in the host vehicle CA, or using road infrastructures with which the ECU 4 of the host vehicle CA can communicate, etc. Besides, if the perception object TA is a preceding vehicle, the perception object data may also be acquired via a vehicle-to-vehicle communication devices of the perception object TA and the host vehicle CA, or via a road infrastructure with which the perception object TA and the ECU 4 of the host vehicle CA are able to communicate.

Besides, the position of the perception object TA relative to the host vehicle CA is not limited to an area forward from the host vehicle CA as in the foregoing embodiment. That is, the position of the host vehicle CA relative to the perception object TA may be any position as long as the position thereof is outside the host vehicle CA, and is perceivable by the driver. For example, in the case where the perception object TA is positioned at a side of the host vehicle CA, the driver can directly perceive the perception object TA, so that the vehicle control method of this invention is applicable. Besides, in the case where the perception object TA is positioned rearward of the host vehicle CA, the driver can perceive the perception object TA directly or via a side mirror or a rear view mirror, so that the vehicle control method of the invention is applicable. Therefore, for example, in the case where the perception object TA is a vehicle that is traveling in the rear of the host vehicle CA and in a lane next to the lane in which the host vehicle CA is cruising, the vehicle control can be performed on the basis of the perceived relative physical quantity when the driver changes the cruising lane of the host vehicle CA to the next lane, that is, in the case of lane changing or lane merging. The vehicle control herein includes the deceleration control, an acceleration control, a turning control, a warning control, etc.

Besides, the perceived relative ratio X is not limited to the ratio between the perceived relative distance Ds and the perceived relative velocity Vs as in the foregoing embodiment, but may be any ratio as long as at least one of the denominator and the numerator of the ratio includes a perceived relative physical quantity. For example, the perceived relative ratio X may also be a ratio between the perceived relative distance Ds and the actual relative velocity Vr, or a ratio between the actual relative distance Dr and the perceived relative velocity Vs. Besides, although the perceived relative ratio X is expressed above as a fraction by using the perceived relative distance Ds as the numerator and the perceived relative velocity Vs as the denominator, the perceived relative velocity Vs may instead be used as the numerator and the perceived relative distance Ds may be used as the denominator. Besides, the vehicle control is not necessarily performed on the basis of the perceived relative ratio X as in the foregoing embodiment, but may also be performed on the basis of the perceived relative distance Ds and the actual relative velocity Vr, or one of the perceived relative velocity Vs and the actual relative distance Dr. Besides, the control value that reflects the perceived relative physical quantity is not limited to a value related to the control timing as in the foregoing embodiment, but may also be a control value related to a control quantity of the vehicle control. For example, in the case where a control quantity of the vehicle control is acquired on the basis of at least one of the relative ratio, the relative distance and the relative velocity, it is also permissible to acquire a control quantity as a control value related to a control quantity on the basis of the perceived relative ratio X, the perceived relative distance Ds and the perceived relative velocity Vs.

Besides, in the case where the threshold value X0 is set separately for each driver of the host vehicle CA, it can be determined that the attention of the driver has become low if the set threshold value X0 of a driver is surpassed by the actual/perceived relative ratio Xr that is calculated on the basis of the actual relative distance Dr and the actual relative velocity Vr occurring when the driver corresponding to the set threshold value X0 operates the brake pedal of the host vehicle CA. That is, the state of the driver can be estimated on the basis of the actual/perceived relative ratio Xr and the threshold value X0. Therefore, for example, in the case where the actual/perceived relative ratio Xr exceeds the threshold value X0, it is also permissible to perform a warning control, a control for avoiding a collision of the host vehicle CA, a control for mitigating the impact at the collision of the host vehicle CA.

Incidentally, the perceived relative distance Ds, the perceived relative velocity Vs and the perceived relative ratio X may also be acquired by the ECU 4 on the basis of a database that is created by finding relations of each of these values with parameters for calculating these values (the parameters that include the actual relative distance Dr, the actual relative velocity Vr, the vehicle velocity Vm, etc.) beforehand through experiments or the like. Furthermore, the control value that reflects the perceived relative physical quantity (perceived relative ratio X), such as a control value related to the control timing, a control value related to the control quantity, etc. may also be acquired by the ECU 4 on the basis of a database that is created by finding relations of each of these control values with parameters for calculating these values (the parameters that include the actual relative distance Dr, the actual relative velocity Vr, the vehicle velocity Vm, etc.) beforehand through experiments of the like on the basis of the perceived relative physical quantities (the perceived relative distance Ds, and the perceived relative velocity Vs), and the perceived relative ratio X.

As can be understood from the foregoing description, the vehicle control apparatus and the vehicle control method described above are useful for a vehicle control apparatus and a vehicle control method that perform the vehicle control of controlling a vehicle by using as an input value a relative physical quantity that shows a relative relation between the vehicle and a perception object that exists outside the vehicle and that is perceivable by a driver of the vehicle, and are suitable particularly to restrain the discomfort caused to the driver by the vehicle control.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A vehicle control apparatus comprising:
a controller configured to control a vehicle by using as an input value an actual relative physical quantity that shows a relative relation between the vehicle and a perception object that exists outside the vehicle and that is perceivable by a driver of the vehicle, wherein
the vehicle is controlled based on a control value that reflects a perceived relative physical quantity that is a physical quantity corresponding to the actual relative physical quantity and that is a relative physical quantity between the vehicle and the perception object which is perceived by the driver;
the actual relative physical quantity is an actual relative distance between the perception object and the vehicle;
the perceived relative physical quantity is a perceived relative distance that is a relative distance between the vehicle and the perception object which is perceived by the driver; and
the perceived relative distance is smaller than the actual relative distance by an amount that is greater if the actual relative distance is longer.

2. The vehicle control apparatus according to claim 1, wherein the control value is related to at least one of a control timing and a control quantity in a control of the vehicle.

3. The vehicle control apparatus according to claim 1, wherein the controller is further configured to control the vehicle by using as input values the actual relative distance and an actual relative velocity between the vehicle and the perception object that exists outside the vehicle and that is perceivable by the driver of the vehicle, wherein
the vehicle is controlled based on a control value that reflects a perceived relative ratio that is a ratio between the perceived relative distance and one of the actual relative velocity and a perceived relative velocity that is a physical quantity corresponding to the actual relative velocity and that shows a relative velocity between the vehicle and the perception object which is perceived by the driver.

4. The vehicle control apparatus according to claim 3, wherein the control value is related to at least one of a control timing and a control quantity in a control of the vehicle.

5. The vehicle control apparatus according to claim 4, wherein if the control value is related to the control timing, the control of the vehicle is started when the perceived relative ratio exceeds a threshold value.

6. The vehicle control apparatus according to claim 5, wherein the threshold value is set based at least one of the driver and a travel environment of the vehicle.

7. The vehicle control apparatus according to claim 6, wherein if the threshold value is set based on the driver, the threshold value is set based on the actual relative distance and the actual relative velocity occurring at a time of operation of an operation object that is provided in the vehicle so as to be operated by the driver.

8. The vehicle control apparatus according to claim 1, wherein the perceived relative distance is acquired by using an expression (1) below:

$$Ds = Dr^n \quad (1)$$

where Ds is the perceived relative distance, Dr is the actual relative distance, and n is in a range of $0 < n < 1$.

9. The vehicle control apparatus according to claim 8, wherein in the expression (1), n is in a range of $0.7 \leq n \leq 0.8$.

10. The vehicle control apparatus according to claim 1, wherein the perceived relative distance is acquired by using an expression (2) below:

$$Ds = \alpha \log(Dr/D0) \quad (2)$$

where Ds is the perceived relative distance, Dr is the actual relative distance, D0 is a maximum relative distance that is a limit value at which approach of the perception object to the vehicle is not acceptable to the driver of the vehicle, and $\alpha$ is a constant.

11. A vehicle comprising a vehicle control apparatus according to claim 1, wherein the controller is further configured to perform a collision avoidance/mitigation control of at least avoiding a collision of the vehicle with other vehicle that is located in front of the vehicle and that is perceivable by a driver of the vehicle, and mitigating impact when the collision occurs, based on an actual relative distance between the vehicle and the other vehicle, wherein
a likelihood of starting the collision avoidance/mitigation control is higher when the actual relative distance is relatively long than when the actual relative distance is relatively short.

12. A vehicle control method of controlling a vehicle by using an input value an actual relative physical quantity that shows a relative relation between the vehicle and an perception object that exists outside the vehicle and that is perceivable by a driver of the vehicle, comprising:
controlling the vehicle based on a control value that reflects a perceived relative physical quantity that is a physical quantity corresponding to the actual relative physical quantity and that is a relative physical quantity between the vehicle and the perception object which is perceived by the driver, wherein
the actual relative physical quantity is an actual relative distance between the perception object and the vehicle;
the perceived relative physical quantity is a perceived relative distance that is a relative distance between the vehicle and the perception object which is perceived by the driver; and
the perceived relative distance is smaller than the actual relative distance by an amount that is greater if the actual relative distance is longer.

13. The vehicle control method according to claim 12, further controlling the vehicle by using as input values the actual relative distance and an actual relative velocity between the vehicle and the perception object that exists outside the vehicle and that is perceivable by the driver of the vehicle, comprising:
controlling the vehicle based on a control value that reflects a perceived relative ratio that is a ratio between the perceived relative distance and one of the actual relative velocity and a perceived relative velocity that is a physical quantity corresponding to the actual relative velocity and that shows a relative velocity between the vehicle and the perception object which is perceived by the driver.

* * * * *